United States Patent
Gammill

(10) Patent No.: US 9,776,594 B2
(45) Date of Patent: Oct. 3, 2017

(54) AIRBAG TETHER RELEASE ASSEMBLIES

(71) Applicant: Autoliv ASP, Inc., Ogden, UT (US)

(72) Inventor: Kurt L. Gammill, Layton, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 24 days.

(21) Appl. No.: 14/960,185

(22) Filed: Dec. 4, 2015

(65) Prior Publication Data
US 2017/0158161 A1 Jun. 8, 2017

(51) Int. Cl.
*B60R 21/16* (2006.01)
*B60R 21/2338* (2011.01)

(52) U.S. Cl.
CPC *B60R 21/2338* (2013.01); *B60R 2021/23384* (2013.01)

(58) Field of Classification Search
CPC .............. B60R 21/16; B60R 21/2338; B60R 2021/23384
USPC ...................................... 280/743.2
See application file for complete search history.

(56) References Cited

U.S. PATENT DOCUMENTS

| | | | |
|---|---|---|---|
| 6,932,384 B2* | 8/2005 | Waid | B60R 21/233 280/739 |
| 8,408,585 B2* | 4/2013 | Paxton | B60R 21/2338 280/728.2 |
| 8,602,453 B1* | 12/2013 | Stevens | B60R 21/2338 280/743.2 |
| 2004/0012179 A1* | 1/2004 | Pinsenschaum | B60R 21/233 280/739 |
| 2004/0046376 A1* | 3/2004 | Ryan | B60R 21/233 280/743.2 |
| 2005/0057027 A1 | 3/2005 | Fogle, Jr. et al. | |
| 2006/0284404 A1 | 12/2006 | Green et al. | |
| 2006/0290117 A1* | 12/2006 | Fischer | B60R 21/2338 280/739 |
| 2009/0167006 A1* | 7/2009 | Schonhuber | B60R 21/233 280/741 |
| 2010/0090445 A1 | 4/2010 | Williams et al. | |
| 2012/0242068 A1 | 9/2012 | Paxton et al. | |

(Continued)

FOREIGN PATENT DOCUMENTS

| | | |
|---|---|---|
| DE | 102012023877 | 6/2014 |
| DE | 102012023878 | 6/2014 |
| EP | 1769978 | 4/2007 |

(Continued)

OTHER PUBLICATIONS

Concise Explanation of Relevance of DE102012023877.
Concise Explanation of Relevance of DE102012023878.
Concise Explanation of Relevance of EP1769978.

*Primary Examiner* — Faye M Fleming
(74) *Attorney, Agent, or Firm* — Phillips Ryther & Winchester; Matthew D. Thayne

(57) ABSTRACT

Airbag cushion assemblies comprising tether release functionality. Some embodiments may comprise an airbag housing comprising an airbag housing opening configured to receive a squib. An airbag cushion may be coupled with the airbag housing and a tether comprising a tether opening may be coupled with at least a portion of the airbag cushion. A squib may be positioned to extend through the tether opening and positioned within the airbag housing opening. The squib may be configured to, upon actuation, separate to release the tether.

21 Claims, 3 Drawing Sheets

(56) References Cited

U.S. PATENT DOCUMENTS

2012/0242069 A1 9/2012 Parks et al.
2014/0339799 A1 11/2014 Englbrecht et al.

FOREIGN PATENT DOCUMENTS

| WO | WO2007065715 | 6/2007 |
| WO | WO2012129467 | 9/2012 |
| WO | WO2014106567 | 7/2014 |

\* cited by examiner

AIRBAG TETHER RELEASE ASSEMBLIES

SUMMARY

Airbag tethers are sometimes used for various purposes, such as opening of a vent within an airbag cushion or maintaining a desired shape and/or size within an airbag cushion, for example. Some such tethers require use of a device to trigger release of the tether during or otherwise in connection with deployment of the airbag cushion. It has been proposed in some cases that a pyrotechnic device be used to trigger, for example, a piston that may be used to cut a tether upon actuation to release the tether.

However, existing solutions are typically bulky and/or expensive. The size of various existing tether release systems, for example, prevents the system from being received in certain driver airbag package designs. Existing solutions are often also unnecessarily complicated and/or heavy.

The present inventors have therefore determined that it would be desirable to provide systems and methods that overcome one or more of the foregoing limitations and/or other limitations of the prior art. In a more particular example of an airbag cushion assembly according to some embodiments, the assembly may comprise an airbag housing comprising an airbag housing opening configured to receive an actuator. The airbag housing may comprise, for example, a through hole or, alternatively, a blind hole. In some embodiments, the actuator may be configured to separate upon deployment. In some embodiments, the actuator may comprise a pyrotechnic device. In some such embodiments, the pyrotechnic device may comprise a squib. An airbag cushion may be coupled with the airbag housing and a tether may be coupled with at least a portion of the airbag cushion. In some embodiments, the tether may comprise a tether opening such that the actuator/squib can extend through the tether opening and be positioned within the airbag housing opening such that the actuator/squib is configured to, upon actuation, separate to release the tether. In other embodiments, the tether may comprise a loop at one end that may be wrapped around a portion of the actuator/squib.

In some embodiments, the squib may comprise a can and a header. In some such embodiments, the can may be configured to separate from the header upon actuation. In some embodiments, the assembly may be configured such that the can, or at least a portion of the can, remains in the airbag housing opening following actuation of the squib.

In some embodiments, the actuator/squib may comprise a weakened portion configured to facilitate separation of the actuator/squib into at least two separate portions upon actuation of the actuator/squib. In some such embodiments, the tether may be coupled with the actuator/squib such that the tether opening is positioned about the weakened portion of the actuator/squib.

In some embodiments, the airbag housing opening may be formed in a tab extending at an angle relative to a surface, such as an internal surface, of the airbag housing. In some such embodiments, the tab may comprise a piece cut from a portion of the airbag housing defining the surface. In some such embodiments, the tab may be bent so as to extend at an angle relative to the surface. In some embodiments, the airbag housing opening may be positioned to allow the actuator/squib to extend at least approximately parallel to the surface.

In another particular example of an airbag cushion assembly according to some embodiments, the assembly may comprise an airbag housing and a tab coupled with the airbag housing, wherein the tab comprises a tab opening configured to receive an actuator, such as a pyrotechnic device. An airbag cushion may be coupled with the airbag housing and a tether may be coupled with at least a portion of the airbag cushion. An actuator may be coupled with the tether and extend through the tab opening. The actuator may be configured to, upon actuation, separate to release the tether. In some embodiments, the tether may comprise a tether opening. In some such embodiments, the tether opening may be aligned with the tab opening such that the actuator can extend through both the tether opening and the tab opening.

In some embodiments, the tab opening may comprise a plurality of slots formed about a periphery of the tab opening. In some such embodiments, the slots may form a plurality of fingers. The plurality of slots and/or fingers may allow the size of the tab opening to flex to accommodate the actuator and to, upon receipt of the actuator, allow the tab opening to retain the actuator. Regardless of whether slots and/or fingers are present, preferably the tab opening is configured to retain at least a portion of the actuator following actuation of the actuator and release of the tether.

In some embodiments, the actuator comprises a pyrotechnic device comprising a can and a header. In some such embodiments, the can comprises a weakened portion configured to facilitate separation of the pyrotechnic device at the weakened portion upon actuation of the pyrotechnic device. In some such embodiments, the tab opening may be configured to retain at least a portion of the can following actuation of the pyrotechnic device.

In some embodiments, the tab opening may be positioned to allow the actuator to extend at least approximately parallel to an adjacent portion of the airbag housing.

Some embodiments may comprise a locking cap configured to facilitate coupling of the actuator within the tab opening. In some such embodiments, the locking cap may comprise one or more barbs that may be configured to engage a surface of the tab adjacent to the tab opening. In some such embodiments, a plurality of radially extending barbs comprising hooked end portions may be provided.

In still another example of an airbag cushion assembly, the assembly may comprise an airbag housing having a tab formed from the airbag housing. The tab may comprise a cutout region from a portion of the airbag housing and may be bent so as to extend at the angle relative to the airbag housing. The tab may further comprise a tab opening configured to receive a squib therein.

An airbag cushion may be coupled with the airbag housing and a tether may be coupled with at least a portion of the airbag cushion. A squib or other pyrotechnic device may be positioned within the tab opening. The squib may comprise a can; a header; and a weakened portion configured to separate the can from the header upon actuation. In some embodiments, at least a portion of the tether may be positioned adjacent to the weakened portion. The squib may be configured to, upon actuation, separate to release the tether. In some embodiments, the airbag cushion assembly may be configured to, upon actuation of the squib, free the tether from the squib without any portion of the squib remaining coupled to the tether.

In some embodiments, the tether may comprise a tether opening. The tether opening may be aligned with the tab opening prior to actuation of the squib. The squib may extend through the tether opening and the tab opening prior to actuation of the squib.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to airbag cushion assemblies comprising tether release components. More particularly, in some embodiments and implementations, a pyrotechnic device, such as a squib, or another actuator, such as a spring-loaded actuator, may be configured to separate upon deployment to release a tether coupled to a portion of an airbag cushion, such as a vent opening of the airbag cushion.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
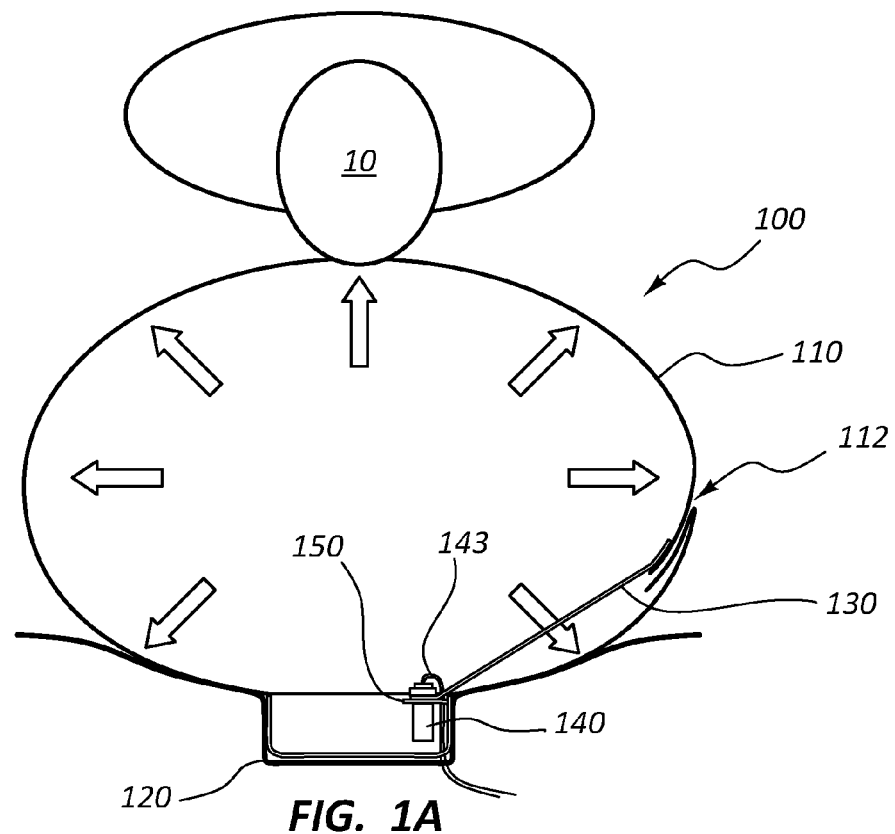
FIG. 1A illustrates an embodiment of an airbag cushion assembly according to some embodiments shown during an initial stage of actuation.
Figure 1B:
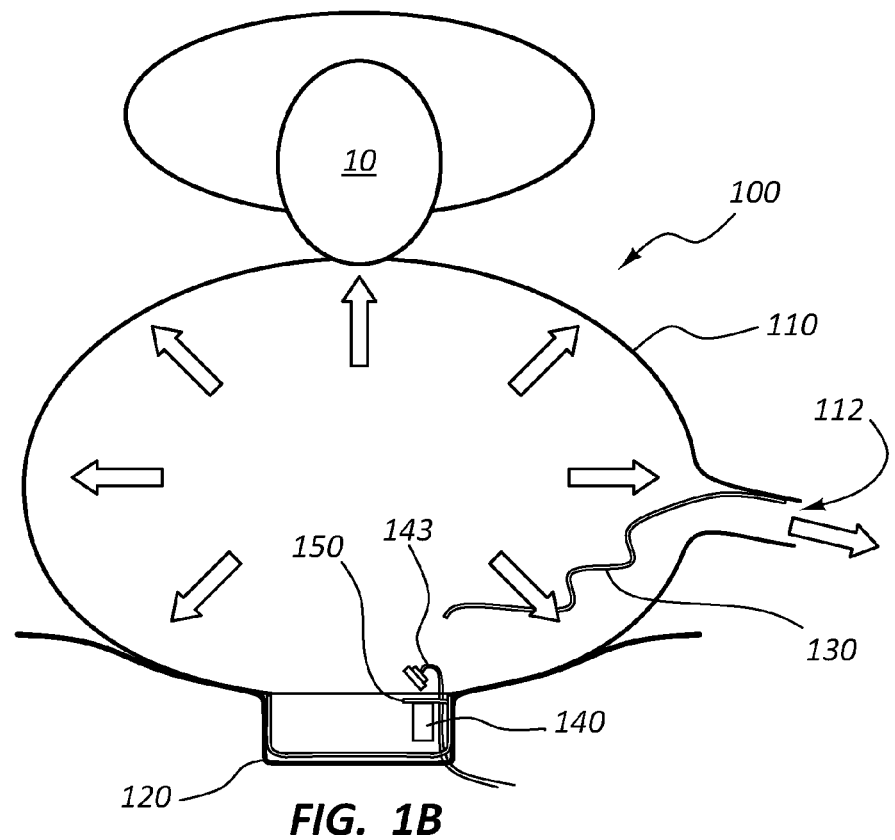
FIG. 1B illustrates the embodiment of FIG. 1A following actuation of a tether release system according to an embodiment of the invention.

FIGS. 1A and 1B depict an airbag cushion assembly 100 according to some embodiments. Airbag cushion assembly 100 comprises an airbag cushion 110 extending from an airbag housing 120 towards a vehicle occupant 10 during deployment of the airbag cushion 110. A tether 130 is coupled with airbag cushion 110. Tether 130 is coupled with a vent opening 112 formed within airbag cushion 110. Thus, upon release of tether 130, vent opening 112 may be released to allow for venting of inflation gases from airbag cushion 110.

Separate from an initiator or other pyrotechnic device (not shown) that may be used to initiate deployment of airbag cushion 110, another pyrotechnic device, such as a squib 140, may be used to release tether 130, as depicted in FIG. 1B and as described in greater detail below.

In preferred embodiments, pyrotechnic device 140 comprises a small pyrotechnic device than would normally be used in terms of physical size and/or force delivered during deployment. Thus, in some preferred embodiments, squib 140 may comprise a relatively small physical size. For example, in some embodiments, the squib be between about 5 mm and about 10 mm in diameter and may be between about 5 mm and about 25 mm in length. In addition, preferably the squib is relatively small in terms of force and/or amount of pyrotechnics. For example, in some embodiments, the amount of pyrotechnic material may be between about 250 and about 1,000 mg in total.

In the depicted embodiment, airbag housing 120 comprises a tab 150 configured to receive squib 140. In this manner, at least a portion of squib 140 can be retained by airbag housing 120 following deployment rather than allowing it to be scattered loose within airbag cushion 110.

Thus, as depicted in FIG. 1B, upon receipt of an electrical signal or other actuation of squib 140, in some embodiments through a squib actuation wire 143, squib 140 is configured to separate to release tether 130 and allow for release of gas through vent opening 112. Although the preferred embodiment depicted in these figures utilizes a vent tether 130, other embodiments are contemplated in which tether 130 may be used for other purposes. For example, in some embodiments, tether 130 may simply be used to control a size of airbag cushion 110 and, thus, may simply be coupled at one or more locations to airbag cushion 110 and, upon release, may be configured to allow the airbag cushion 110 to expand beyond what would otherwise be allowed due to the presence of tether 130. Similarly, although a single tether is shown in the depicted embodiment, a plurality of tethers may be used in other embodiments. In some such embodiments, a plurality of tethers may be coupled to a single squib or other pyrotechnic device. In other embodiments, multiple squibs or pyrotechnic devices may be used. In still other embodiments, an alternative actuator, such as a spring-loaded device, for example, may be used in place of a pyrotechnic device.

Figure 2:
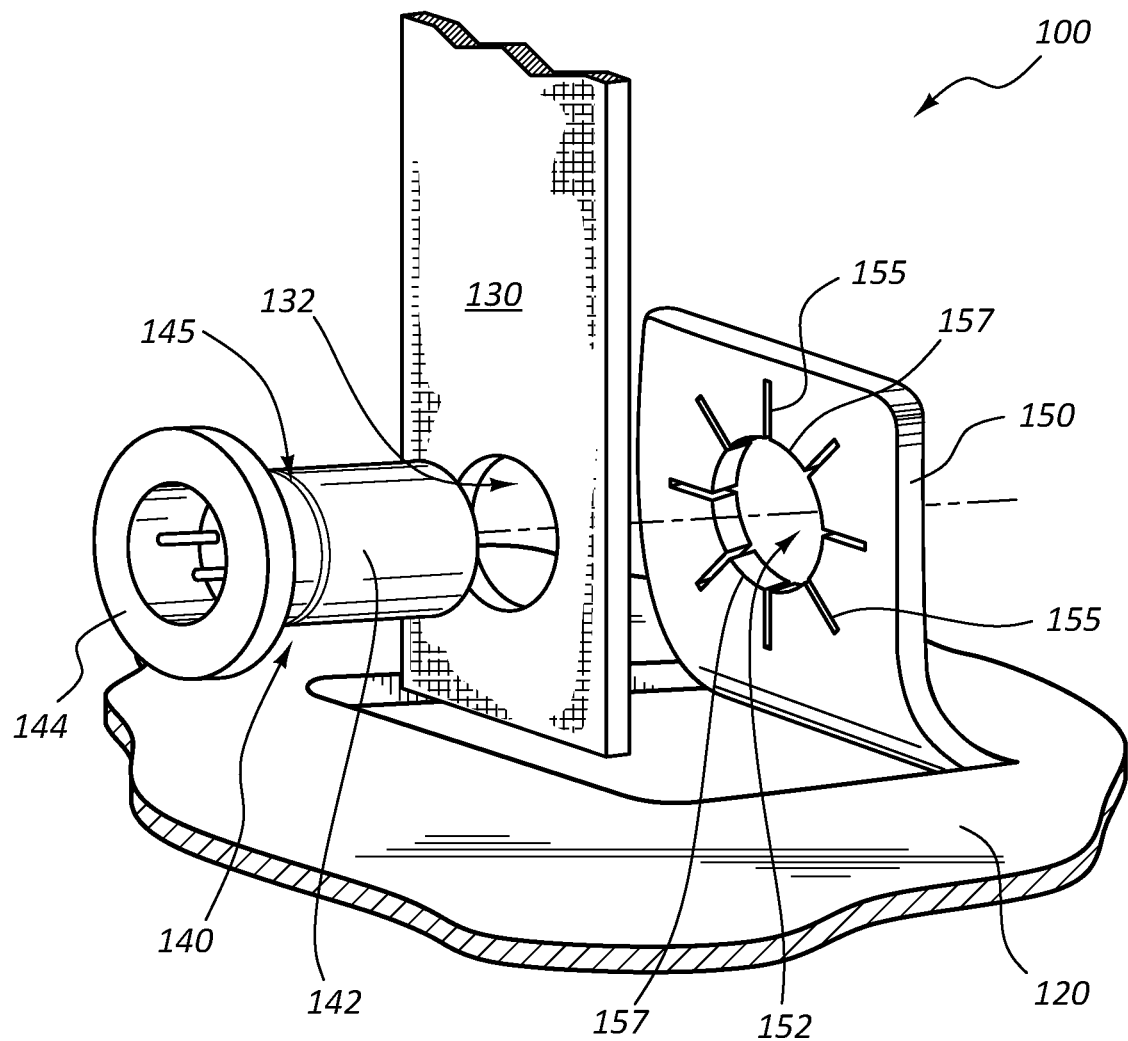
FIG. 2 is a partial, close-up, perspective view of the tether release components of the airbag cushion assembly of FIGS. 1A and 1B.

FIG. 2 is a close-up view of the interface between tether 130 and airbag housing 120. As shown in this figure, tether 130 may comprise a tether opening 132. Tether opening 132 may be configured to receive a portion of squib 140 therein. More particularly, in the depicted embodiment, tether opening 132 is configured to receive a can portion 142 of squib 140. Can portion 142, or at least a portion of can portion 142, may be separated from a header portion 144 along a score line or weakened portion 145. Weakened portion 145 may be configured to facilitate separation of squib 140 at and/or along the weakened portion 145 upon actuation of squib 140. In some embodiments, tether opening 132 may be sized and shaped so as to allow for tether opening 132 to rest within and/or be positioned immediately adjacent to the weakened portion 145 such that tether 130 can be more easily released upon separation of squib 140 upon deployment. Thus, if the weakened portion 145 comprises a score line, the portion of tether 130 defining tether opening 132 may rest within the score line prior to deployment.

In some embodiments, tab 150 may extend at an angle relative to an adjacent surface of airbag housing 120. In some such embodiments, tab 150 may extend at at least an approximately perpendicular angle relative to airbag housing 120. In some embodiments, tab 150 may comprise a portion cut or lanced from a portion of the airbag housing 120. In embodiments in which tab 150 comprises a rectangular shape, tab 150 may be cut along three sides with the fourth side remaining intact to keep tab 150 coupled with airbag housing 120, as depicted in FIG. 2. Tab 150 may then be bent so as to extend at the desired angle relative to airbag housing 120. In the depicted embodiment, tab 150 extends at least approximately perpendicular relative to an adjacent surface of airbag housing 120 such that squib 140 extends at least approximately parallel to the adjacent surface of airbag housing 120.

However, a wide variety of alternative embodiments are contemplated. For example, in some embodiments, tab 150 may be coupled with airbag housing 120 rather than being an integral part of and formed from airbag housing 120. As another example, tether 130 may be coupled with squib 140 in another manner other than being received in an opening formed within tether 130. For example, tether 130 may instead be wrapped around squib 140. In some such embodiments, tether 130 may be formed with a loop at one end to facilitate such coupling.

In some embodiments, squib 140 may also be configured to be received in a similar opening 152 formed within tab 150, as shown in FIG. 2. In some embodiments, opening 152 may comprise a through hole, as also shown in FIG. 2, such that the squib 140 can extend extend through the through hole 152. In other embodiments, however, opening 152 may comprise a blind hole.

In some embodiments, one or more slots 155 may be formed about a periphery of the tab opening 152. In some embodiments, slots 155 may extend radially from a center of tab opening 152. Such slots 155 may be configured to facilitate insertion of squib 140 therein and/or to retain at least a portion of squib 140 therein following deployment. For example, in some embodiments, slots 155 may form a plurality of fingers 157 in between adjacent slots 155. Although in the depicted embodiment, slots 155 are formed as a single slit formed in between adjacent fingers 157, alternative embodiments are contemplated in which slots 155 may allow for spacing between adjacent fingers 157. In some embodiments, fingers 157 may be configured to flex to accommodate squib 140, such as can portion 142 of squib 140, and then flex back into place to provide a means for securing a pyrotechnic device, such as squib 140, to an airbag housing tab, such as within tab opening 152 of tab 150. Slots 155 and/or fingers 157 should therefore be considered examples of means for securing a pyrotechnic device to an airbag housing. Slots 155 and/or fingers 157 should also be considered examples of means for securing a pyrotechnic device within an airbag housing opening and examples of means for securing a pyrotechnic device within an opening formed within an airbag housing tab.

Other embodiments are contemplated in which squib 140, or another pyrotechnic device, may instead be fixedly retained to an airbag housing and/or airbag housing tab in another manner. For example, in some embodiments, opening 152 may be dimensioned and configured such that squib 140 fits within opening 152 in an interference fit configuration. In still other embodiments, other means for securing a pyrotechnic device to an airbag housing and/or tab coupled with an airbag housing may be used.

Figure 3:
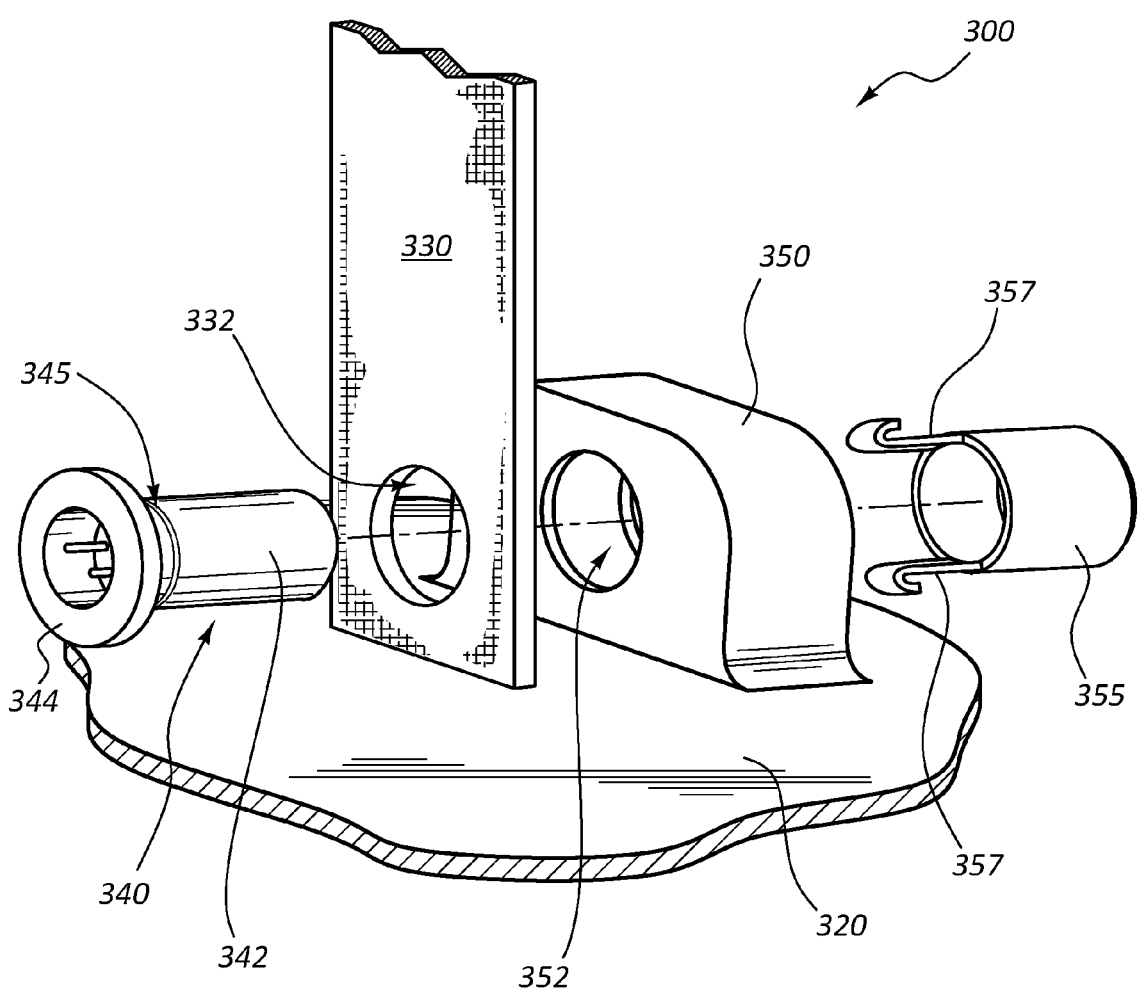
FIG. 3 is a partial, close-up, perspective view of the tether release components of an alternative embodiment.

For example, FIG. 3 illustrates an alternative embodiment of an airbag assembly 300. Like FIG. 2, FIG. 3 is a close-up view of the interface between a tether 330 and an airbag housing 320 of assembly 300. As also shown in this figure, tether 330 comprises a tether opening 332 configured to receive a can portion 342 of squib 340. Can portion 342 of squib 340 is separated from a header portion 344 along a weakened portion 345 such that, as described above, upon actuation of squib 340, squib 340 may separate at weakened portion 345 to allow for release of tether 330.

A tab 350 extends from airbag housing 320. Tab 350 may comprise an integral portion of airbag housing 320 or, alternatively, may be coupled with airbag housing 320, such as by, for example, molding tab 350 to airbag housing 320 or use of adhesives and/or fasteners.

Like tab 150, tab 350 extends at at least an approximately perpendicular angle relative to airbag housing 320 to allow squib 340 to extend at least approximately parallel to the adjacent surface of airbag housing 320. Squib 340 is configured to be received in opening 332 and in tab opening 352 formed within tab 350, as shown in FIG. 3. In some embodiments, opening 352 may comprise a through hole or, alternatively, may comprise a blind hole.

In the depicted embodiment, opening 352 comprises a through hole such that a portion of can portion 342 may extend through opening 352 and be received within locking cap 355. Locking cap 355 may comprise one or more prongs 357. In some embodiments, prongs 357 may comprise hooked end portions to allow for locking can portion 342 in place. More specifically, prongs 357 may be configured to extend through opening 352 simultaneously with, and in an opposite direction relative to, can portion 342 and then the hooked end portions may engage a portion of a surface of tab 350 adjacent to opening 352. In some embodiments, prongs 357 may be resiliently biased such that they can be pinched towards one another and then expand upon exiting opening 352 to allow for engagement of the hooked end portions with tab 350. Locking cap 355 preferably comprises a closed end such that the force generated by deployment of squib 340 does not result in can portion 342 extending all of the way through tab opening 352 during deployment. Prongs 357 is another example of means for securing a pyrotechnic device or another actuator to an airbag housing and/or tab coupled with an airbag housing.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
   an airbag housing comprising an airbag housing opening configured to receive a squib, wherein the airbag housing opening is formed in a tab extending at an angle relative to an internal surface of the airbag housing;
   an airbag cushion coupled with the airbag housing;
   a tether coupled with at least a portion of the airbag cushion, wherein the tether comprises a tether opening; and
   a squib extending through the tether opening and positioned within the airbag housing opening, wherein the squib is configured to, upon actuation, separate to release the tether.

2. The airbag cushion assembly of claim 1, wherein the squib comprises a can and a header, and wherein the can is configured to separate from the header upon actuation.

3. The airbag cushion assembly of claim 2, wherein the can is configured to remain in the airbag housing opening following actuation of the squib.

4. The airbag cushion assembly of claim 1, wherein the squib comprises a weakened portion configured to facilitate separation of the squib into at least two separate portions upon actuation of the squib.

5. The airbag cushion assembly of claim 4, wherein the tether is positioned on the squib such that the tether opening is positioned about the weakened portion of the squib.

6. The airbag cushion assembly of claim 1, wherein the tab is cut from a portion of the airbag housing defining the internal surface, and wherein the tab is bent so as to extend at the angle relative to the internal surface.

7. The airbag cushion assembly of claim 6, wherein the airbag housing opening is positioned to allow the squib to extend at least approximately parallel to the internal surface.

8. The airbag cushion assembly of claim 1, wherein the airbag housing opening comprises a through hole, and wherein the squib is configured to extend through the through hole.

9. An airbag cushion assembly, comprising:
   an airbag housing;
   a tab coupled with the airbag housing, wherein the tab comprises a tab opening configured to receive a pyrotechnic device;
   an airbag cushion coupled with the airbag housing;
   a tether coupled with at least a portion of the airbag cushion; and
   an actuator extending through the tab opening and coupled with the tether, wherein the actuator is configured to, upon actuation, separate to release the tether.

10. The airbag cushion assembly of claim 9, wherein the tether comprises a tether opening, and wherein the tether opening is aligned with the tab opening such that the actuator extends through both the tab opening and the tether opening.

11. The airbag cushion assembly of claim 9, wherein the actuator comprises a pyrotechnic device.

12. The airbag cushion assembly of claim 9, wherein the pyrotechnic device comprises a squib.

13. The airbag cushion assembly of claim 9, wherein the tab opening comprises a plurality of slots formed about a periphery of the tab opening.

14. The airbag cushion assembly of claim 13, wherein the plurality of slots allow the size of the tab opening to flex to accommodate the actuator and to, upon receipt of the actuator, allow the tab opening to retain the actuator.

15. The airbag cushion assembly of claim 9, wherein the tab opening is configured to retain at least a portion of the actuator following actuation of the actuator and release of the tether.

16. The airbag cushion assembly of claim 15, wherein the actuator comprises a pyrotechnic device, wherein the pyrotechnic device comprises a can and a header, and wherein the can comprises a weakened portion configured to facilitate separation of the pyrotechnic device at the weakened portion upon actuation of the pyrotechnic device.

17. The airbag cushion assembly of claim 16, wherein the tab opening is configured to retain at least a portion of the can following actuation of the pyrotechnic device.

18. The airbag cushion assembly of claim 9, wherein the tab opening is positioned to allow the actuator to extend at least approximately parallel to an adjacent portion of the airbag housing.

19. The airbag cushion assembly of claim 9, further comprising a locking cap configured to facilitate coupling of the actuator within the tab opening.

20. An airbag cushion assembly, comprising:
   an airbag housing;
   a tab formed from the airbag housing, wherein the tab comprises a cutout region from a portion of the airbag housing, wherein the tab is bent so as to extend at the angle relative to the airbag housing, and wherein the tab comprises a tab opening configured to receive a squib therein;
   an airbag cushion coupled with the airbag housing;
   a tether coupled with at least a portion of the airbag cushion; and
   a squib positioned within the tab opening, wherein the squib comprises:
      a can;
      a header; and
      a weakened portion configured to separate the can from the header upon actuation, wherein at least a portion of the tether is positioned adjacent to the weakened portion, wherein the squib is configured to, upon actuation, separate to release the tether, and wherein the airbag cushion assembly is configured to, upon actuation of the squib, free the tether from the squib without any portion of the squib remaining coupled to the tether.

21. The airbag assembly of claim 20, wherein the tether comprises a tether opening, wherein the tether opening is aligned with the tab opening prior to actuation of the squib, and wherein the squib extends through the tether opening and the tab opening prior to actuation of the squib.

* * * * *